Nov. 10, 1931.  E. STAUDER  1,831,204

HACK SAW SHARPENING MACHINE

Filed March 11, 1930  3 Sheets-Sheet 1

INVENTOR
Emanuel Stauder
BY
Edward H. Crumpton
his ATTORNEY

Nov. 10, 1931.    E. STAUDER    1,831,204
HACK SAW SHARPENING MACHINE
Filed March 11, 1930    3 Sheets-Sheet 3

INVENTOR
Emanuel Stauder
BY
his ATTORNEY

Patented Nov. 10, 1931

1,831,204

UNITED STATES PATENT OFFICE

EMANUEL STAUDER, OF ROCHESTER, NEW YORK, ASSIGNOR TO HUTHER BROTHERS SAW MANUFACTURING COMPANY, OF ROCHESTER, NEW YORK, A CORPORATION OF NEW YORK

HACK SAW SHARPENING MACHINE

Application filed March 11, 1930. Serial No. 434,939.

This invention relates to a machine for sharpening saws such, for example, as hack saws. The principal object of the invention is to provide a relatively light, simple, and compact machine which may be operated easily and which will be efficient in sharpening saws.

Another object of the invention is the provision of a saw sharpening machine so arranged that different teeth of the same saw may be ground to different shapes, and particularly so that one tooth may be ground high on one side and another tooth may be ground high on the other side, all without interfering substantially with the rapidity of the grinding or sharpening operation.

A further object is the provision of improved mechanism for feeding a saw blade to present successive teeth thereof to the grinding or sharpening tool.

To these and other ends the invention resides in certain improvements and combinations of parts, all as will be hereinafter more fully described, the novel features being pointed out in the claims at the end of the specification.

In the drawings:

Fig. 5 is an enlarged plan view of a fragment of the machine showing details of the saw feeding mechanism;

Fig. 8 is a horizontal section substantially on the line 8—8 of Fig. 3, and

Fig. 9 is an enlarged cross-section through a portion of a saw blade which has been sharpened on the present machine.

Similar reference numerals throughout the several views indicate the same parts.

Figure 6:
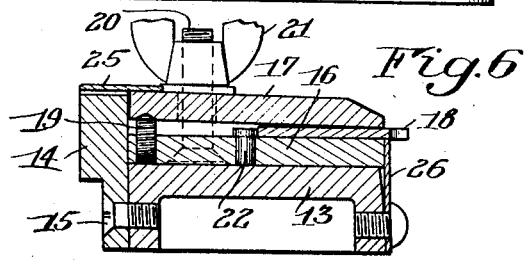
Fig. 6 is a vertical section taken transversely through the saw blade, the saw carriage, and the track on which the carriage operates.

According to the preferred embodiment of the invention illustrated by way of example in the accompanying drawings, there is provided a base plate 10 having a standard 11 near the left hand end thereof and a standard 12 near the right hand end. These standards support means for holding a saw blade, which means comprises a track including a substantially horizontal member 13 and a substantially vertical plate 14 at the front edge thereof and held in place thereon by screws 15, as shown especially in Fig. 6. A saw carriage is movable longitudinally along this track, the carriage including a bottom plate 16 and a top plate 17 arranged to receive a saw blade 18 between them. Screws 19 threaded upwardly through the plate 16 provide an abutment upon which the front edge of the upper plate 17 rests, as shown in Fig. 6, and the two plates are clamped together by means of a plurality of clamping screws 20 provided with wing nuts 21.

It is desirable that the saw blades shall be clamped firmly along a line as close as possible to the teeth which are to be sharpened. The carriage above described permits such clamping of the blade in a satisfactory manner. The abutment screws 19 may be adjusted to provide a larger space between the front edges of the plates 16 and 17 when a thicker saw blade is to be clamped between them, so that the pressure of the clamping plates may come at their rear edges near the teeth of the saw, no matter how thick or thin (within reasonable limits) is the blade which is to be clamped. Stop pins 22 seated in holes in the bottom plate 16 project into the space between the plates 16 and 17, as shown in Fig. 6, and provide abutments against which the edge of the saw blade may be placed as shown in dotted lines in Fig. 4. This permits easy placing of the blade in desired position with its axis parallel to the axis of the carriage, and assists in holding the blade in proper position while the clamping nuts 21 are being tightened. If desired, several sets of holes may be formed in the plates 16 for the insertion of the stop pins 22, so that the pins may be removed from one set of holes and placed in another set when saw blades of substantially different widths are to be sharpened.

The carriage is held in position on the track members 13 and 14 by suitable resilient means, such as the leaf springs 25 (Figs. 4 and 6) pressing downwardly upon the top of the carriage at the front edge thereof to hold it firmly against the bottom plate 13 of the track and similar leaf springs 26 (Fig. 6) pressing frontwardly against the rear edge of the carriage to hold it against the front plate 14 of the track. These springs 25 and 26 are of sufficient tension to hold the carriage in place on the track, but they are not of such tension as to prevent movement thereof. On the contrary, the carriage is easily slidable longitudinally along the track so that successive teeth of the saw may be presented to the sharpening or grinding element which will be described hereafter.

Figure 4:
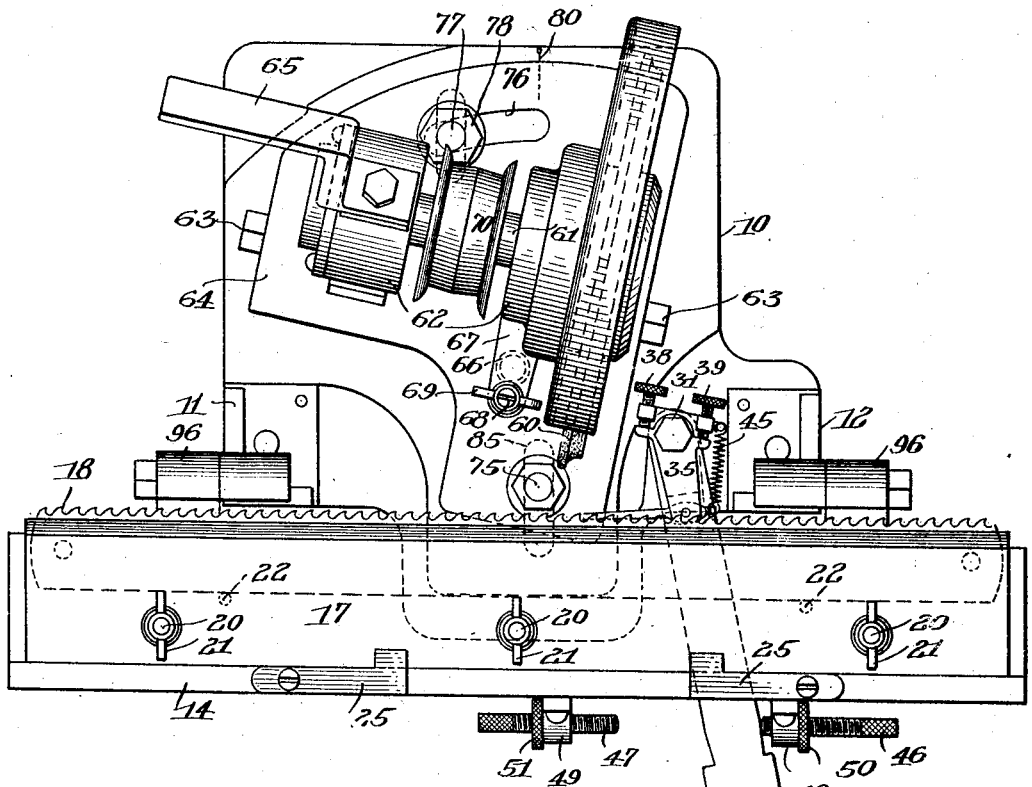
Fig. 4 is a plan view of the machine.

The mechanism for feeding the carriage and saw is best shown in Figs. 4 and 5, and comprises a lever 30 pivoted at its rear end at 31 to a rearward extension 32 on the bottom plate 13 of the track, this lever extending forwardly from its pivot through a cut-out portion or slot 33 in the member 13 to a position conveniently accessible to the operator at the front of the machine, as shown particularly in Fig. 4. The slot 33 through which the lever extends is of substantially the same thickness as the lever, and permits free rightward or leftward movement of the lever through a limited range, but prevents upward or downward movement thereof relative to the track.

Pivotally mounted upon the same stud 31 upon which the lever 30 is pivoted there is a second lever 35 having lugs 36 and 37 engaged respectively by adjusting screws 38 and 39 threaded through lugs 40 and 41 formed on the rear end of the lever 30. By appropriately adjusting the screws 38 and 39, as by screwing one screw in and the other out, the lever 35 may be swung to different angles or positions relative to the lever 30.

Near the forward end of the lever 35 there is pivoted at 42 a pawl 43 having an angular end 44 arranged to extend into the space between two adjacent teeth of the saw and to engage the teeth. A coiled tension spring 45 is secured at one end to the lug 41 on the lever 30 and at the other end to the tail of the pawl 43, so that it tends to move the angular end 44 of the pawl forwardly or into contact with the saw teeth.

When the lever 30 is moved leftwardly from the position shown in Fig. 4, the second lever 35 will move leftwardly with it because the screws 38 and 39 connect the lever 35 to the lever 30 and cause the former to move as a unit with the latter. This leftward movement of the lever 35 carries the pawl 43 thereof leftwardly and the angular end 44 of the pawl, engaging one of the teeth of the saw, pushes leftwardly upon the saw and moves it and the saw carriage leftwardly along the track 13, 14. Then when the lever 30 is swung rightwardly again, the spring 45 allows the end 44 of the pawl to ride over the next saw tooth and it snaps into the interdental space to the right of the one in which it was first engaged. The next leftward movement of the lever 30 will feed the saw and the carriage through the space of one more tooth, and this operation may be repeated as often as may be desired in order to bring successive teeth into cooperation with the sharpening or grinding element.

Adjustable abutments such as the screws 46 and 47 are threaded through lugs 48 and 49 respectively on the track member 14, and are provided with locking nuts 50 and 51. These adjusting screws contact with the edges of the lever 30 and form stops therefor so that the throw of the lever may be accurately adjusted and limited, with the result that the throw of the pawl 43 at each operation of the lever may be made of the proper amount, depending on the distance from one tooth of the saw to the next tooth. Also, the adjusting screws 38 and 39 may be adjusted to swing the lever 35 relative to the lever 30 so as to place the end of the pawl 43 at precisely the right point when the lever 30 is in either extremity of its stroke.

The sharpening or grinding element may comprise a grinding wheel 60 mounted on a shaft 61 journaled in a frame 62 which is pivoted at its lower end at 63 to a supporting plate 64 lying on the base plate 10. The pivotal connection of the frame 62 is such that the frame may be oscillated in a vertical plane extending transversely to the saw, so as to carry the grinding wheel 60 toward and away from the saw teeth. A handle 65 extends upwardly from the frame 62 and forms a convenient means for oscillating the frame when desired. As will be seen, the pivotal axis 63 lies substantially parallel to the plane of the saw blade.

Means is provided tending to hold the frame 62 in its rearward position so that the wheel 60 is out of contact with the saw. This means may comprise the compression spring 66 having its lower end seated in a socket in the support 64 and its upper end pressing upwardly upon a lug 67 extending forwardly from the frame 62. Contact between the frame 62 and the support 64 limits the rearward motion of the frame under the influence of this spring. An adjustable abutment screw 68 having a wing locking nut 69 extends downwardly through the lugs 67 and contacts with the top of the support 64 when the frame 62 is swung forwardly. By adjusting this screw 68, the position of the edge of the grinding wheel 60 at the forward limit of its stroke may be adjusted to a nicety, so that the teeth of the saw may be ground exactly to the desired amount and so that all teeth will be uniformly ground.

Any suitable means is provided for driving the wheel 60. Such means may comprise a pulley 70 on the shaft 61 and a belt 71 extending upwardly to a driving pulley near the ceiling or elsewhere.

Preferably the edge of the grinding wheel 60 is made of a configuration corresponding to the shape of the teeth to be ground, as shown especially in Fig. 5 of the drawings. When it is desired to grind teeth having a different configuration, the wheel 60 may be easily removed from the end of the shaft 61 and another wheel having an edge of different configuration may be substituted.

At times it is desired to grind the saw teeth at a different angle or rake. In order to permit this, the support 64 is pivotally mounted upon the base plate 10 so that it may oscillate about a vertical stud 75 as an axis. This stud, as shown in Fig. 4, is placed near the forward edge of the support 64, and near the rear edge of the support there is an arcuate slot 76 concentric with the stud 75, which slot receives another stud 77 secured to the base plate 10 and passing upwardly through the slot. By loosening the nut 78 on the stud 77, the support 64 may be swung or oscillated to one side or the other about the stud 75 as an axis, and the wheel 60 will thus move as a unit with the support 64. In this way, the grinding wheel 60 may be swung to different angles relative to the saw blade so that the teeth may be ground at different angles of rake. Whenever the wheel has been set in the desired angular position, the tightening of the nut 78 will prevent displacement from such position.

Figure 7:
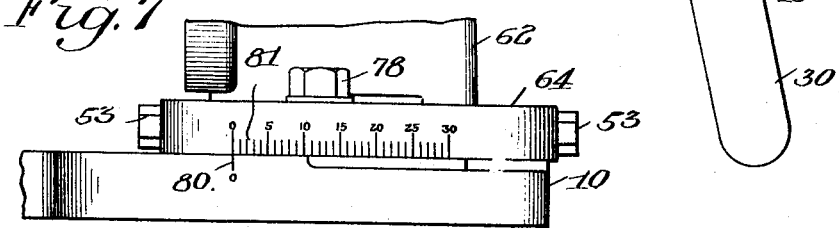
Fig. 7 is a fragmentary rear elevation of the machine illustrating the graduations for setting parts of the mechanism.

As an aid to setting the wheel to the desired angle, the base plate 10 may be provided with a zero index 80 (Figs. 4 and 7) cooperating with degree graduations 81 on the support 64, which graduations when read in conjunction with the index 80 will indicate immediately the angle at which the wheel 60 is set relatively to the axis of the saw blade.

In order to accommodate the mechanism to grinding wheels of different sizes, the entire support 64 and the grinding wheel and other mechanism carried thereby are preferably movable bodily forwardly and backwardly on the base plate 10, in a direction toward and away from the saw. To this end the stud 75 is not fixed immovably in the base plate 10, but is secured in a slot 85 therein, (Fig. 4) which extends forwardly and rearwardly. Likewise, the stud 77 is secured in a forwardly and rearwardly extending slot. When the nuts on both of these studs are loosened, these studs may be slid backwardly or forwardly in their slots and the entire support 64, together with the frame 62 and wheel 60 may be moved toward or away from the saw blade, to accommodate the mechanism to a new grinding wheel of different size or to make it function better with the same grinding wheel if the latter has become smaller by being worn down in use. The zero index 80 is preferably extended some distance forwardly from the rear edge of the base plate 10, as indicated in dotted lines in Fig. 4, so that it may cooperate with the graduations 81 even when the support 64 is moved forwardly on the base plate.

It will be seen from the foregoing description that the handle 65 may be pulled forwardly to oscillate the frame 62 to carry the grinding wheel 60 into contact with the saw blade, and that the feeding lever 30 may be operated to feed the saw blade longitudinally to bring successive teeth thereof into position to be acted upon by the grinding wheel. If all the teeth of any one saw blade were to be ground to exactly the same shape, the mechanism which has thus far been described would accomplish the operation satisfactorily. In many cases, however, it is desired to grind different teeth of the same saw to different shapes. For example, one tooth may be ground high on one side and it may be desired to grind another tooth high on the opposite side. Such a saw is shown in cross section, on a somewhat exaggerated scale, in Fig. 9, where the tooth 90 is high at one side of the saw and the adjacent tooth 91 is high at the other side.

Figure 1:
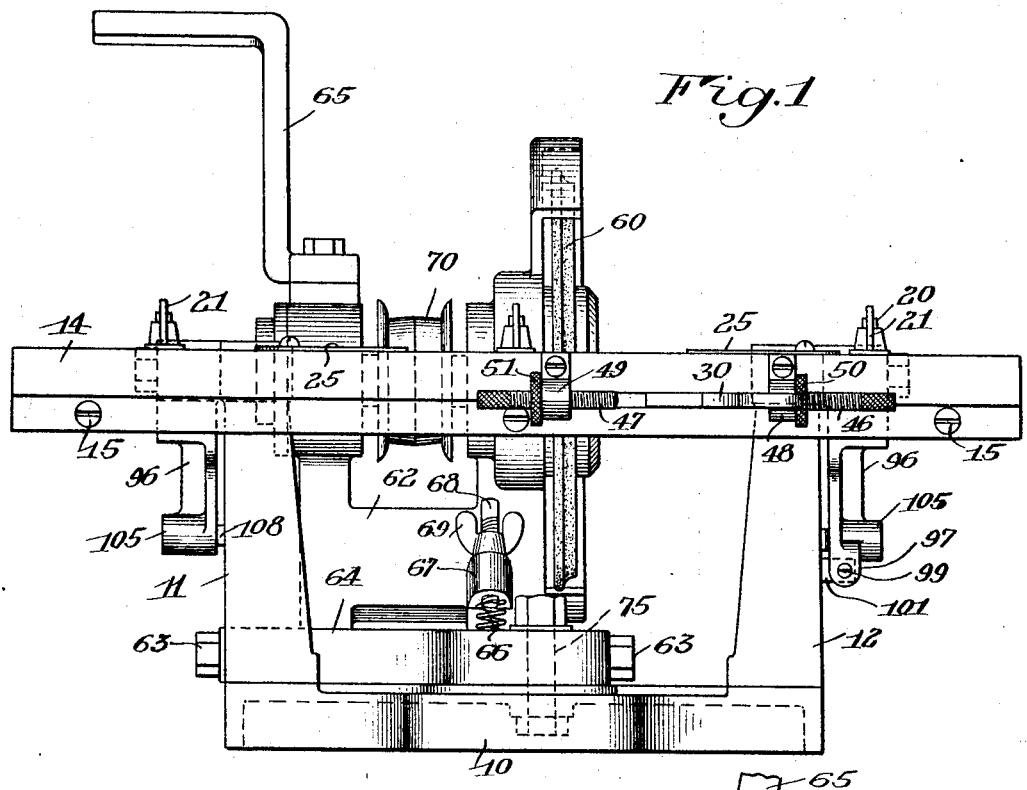
Fig. 1 is a front elevation of a sharpening machine constructed in accordance with a preferred embodiment of the invention.
Figure 2:
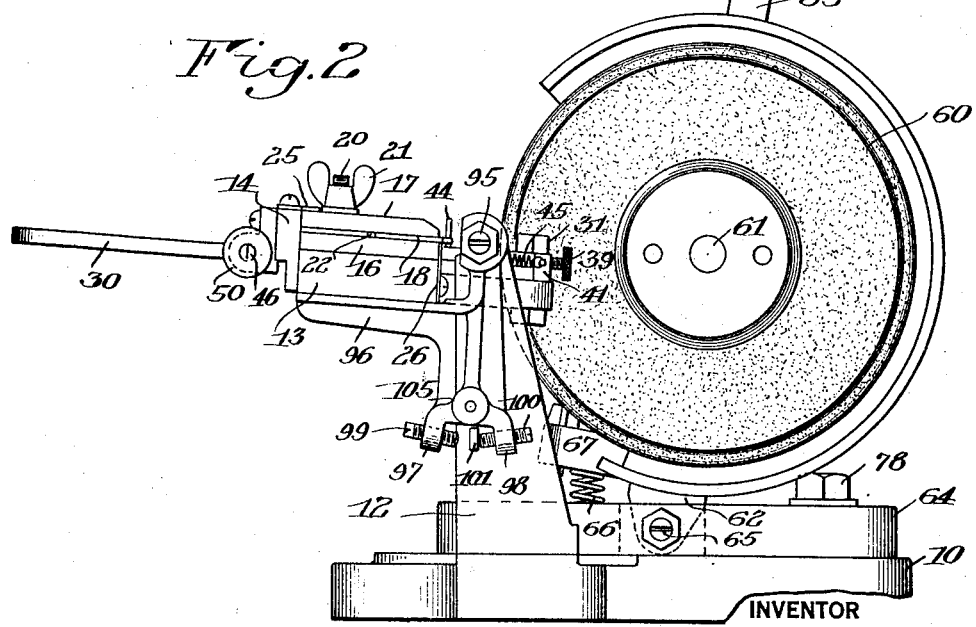
Fig. 2 is a right hand end elevation thereof.
Figure 3:
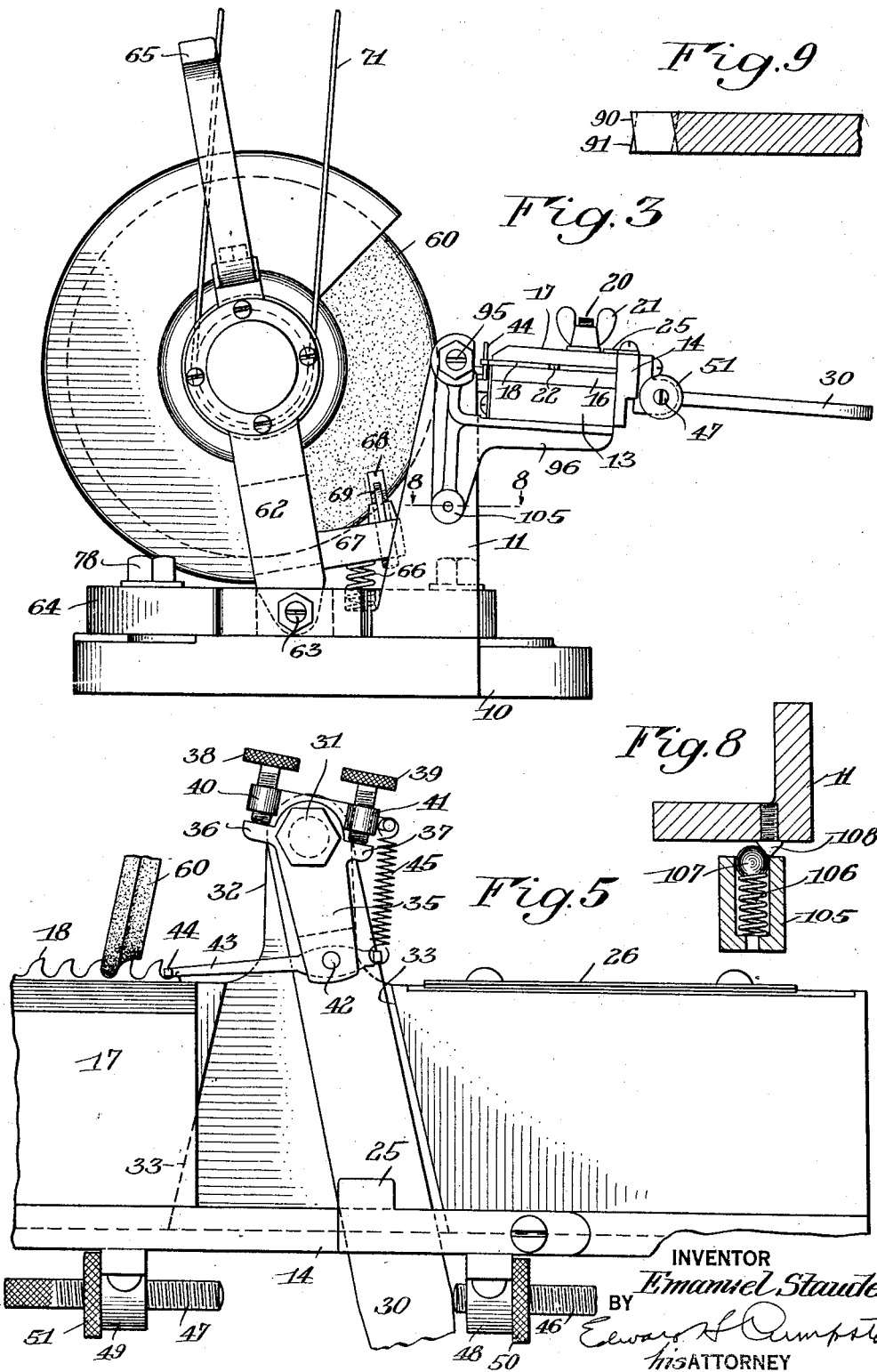
Fig. 3 is a left hand elevation thereof with part of the mechanism moved to a different position.

In order to enable teeth to be ground in this manner rapidly and effectively, the track members 13 and 14 are preferably not fixed rigidly to the standards 11 and 12, but are pivoted thereon so that they may be oscillated about an axis substantially parallel to the plane of the saw blade. As is best shown in Figs. 2 and 3, the upper ends of the standards are provided with pivot pins 95 on which are pivotally mounted brackets 96 and these brackets support the track members 13 and 14. The brackets are preferably so shaped relative to the dimensions of the track that the axis of oscillation 95 is in the plane of the saw blade and parallel to the longitudinal axis thereof. Thus the axis of oscillation may be considered broadly as being parallel to the plane of the saw blade, since a line in a plane may be considered as a special case of a line parallel to a plane, in which the distance between the line and the plane is infinitesimal.

The right hand bracket 96, as best shown in Fig. 2, has forked extensions 97 and 98 through which are threaded adjustable set screws 99 and 100 cooperating with a lug 101 interposed between them and fixed to the standard 12. These set screws limit the oscillating movement of the track about the pivots 95 and they may be adjusted to vary the extent of the movement and to determine the limits thereof.

In order to hold the track members resiliently in either extreme position, resilient detent means is provided. For example, each bracket 96 is provided with an extension 105 having a cavity in which is placed a coiled compression spring 106 (Fig. 8) pressing outwardly upon a ball 107 which cooperates with a triangular member 108 secured to the adjacent standard 11 or 12. The member 108 is so placed on its standard that it will be directly in alinement with the ball 107 when the track is substantially at the middle of its oscillating movement. Thus whenever the track is moved past the middle of its movement in either direction, the springs 106 acting upon the balls 107 will carry the track to the limit of its oscillating movement in that direction and will hold it resiliently in the extreme position until it is purposely displaced therefrom.

The feeding handle 30 provides a convenient means for oscillating the track. It has been explained above that this handle passes through a comparatively thin slot in the track member 13 so that this slot provides guiding surfaces above and below the handle 30 which prevent any upward or downward movement relative to the track. Hence if the front end of the handle be moved upwardly, it will result in oscillating the track about the pivots 95 to a position such as that shown in Fig. 2. Likewise if the handle 30 be forced downwardly, the track and the carriage carried thereby will be oscillated to their other position such as illustrated in Fig. 3. Hence the handle 30 constitutes a member movable in one direction (rightwardly and leftwardly) to feed the saw blade and movable in another direction (upwardly and downwardly) to oscillate the saw blade about the pivotal axis 95.

It will be seen by comparing Figs. 2 and 3 that when the saw blade is oscillated to one position such as that shown in Fig. 2, the plane of the blade lies on one side (that is, below) of the axis 61 about which the grinding wheel 60 revolves, when the wheel is in contact with the saw, and when the blade is oscillated to its other position, such as shown in Fig. 3, the plane of the blade lies on the other side (that is, above) the axis 61 of the wheel 60, when the wheel is in contact with the blade. Hence by oscillating the blade in this manner between the grinding of different teeth, the teeth may be ground so that one of them is high on one side and the other is high on the other side, as illustrated in Fig. 9.

In operation, the carriage comprising the plates 16 and 17 is removed from the track by an endwise or longitudinal movement and these plates are opened up to permit the insertion of the saw blade, such as the hack saw 18 illustrated in Fig. 4. The back of the saw is positioned against the stop pins 22 and the wing nuts 21 are then tightened to clamp the saw firmly in place. When the saw has been clamped in the carriage it is inserted in the track and brought to such position that the left hand tooth of the saw will be in the plane of oscillation of the grinding wheel 60. The grinding wheel is then moved forwardly into contact with the left hand tooth by pulling forwardly on the handle 65 which oscillates the frame 62. When the grinding of this tooth has been finished, the handle 65 is moved rearwardly again, which rearward movement is assisted by the spring 66. The handle 30 is then moved leftwardly to feed the saw leftwardly through the distance of one tooth, and is returned to its initial position. The handle 65 may be pulled forwardly again so as to bring the grinding wheel 60 into contact with the second tooth, and when the grinding of this tooth is complete another leftward movement of the handle 30 feeds the saw and the carriage through the space of one more tooth so that the third tooth is then ready to be operated upon by the grinding wheel. This mode of operation is repeated until the entire saw has been ground or sharpened.

If all of the teeth of the saw are to be ground in the same manner, the set screws 99 and 100 may be tightened against the lug 101 so as to hold the track in its central or intermediate plane. If, however, certain teeth are to be ground high on one side and other teeth are to be ground high on the opposite side, the set screws 99 and 100 are properly adjusted to limit the extent of oscillation of the carriage track to the desired amount, and the blade of the saw is oscillated between the grinding of different teeth by an upward or downward movement of the lever 30.

Extremely rapid grinding of the saw may be accomplished on this machine. For instance, if alternate teeth are to be ground high on one side and the intermediate teeth high on the other side, the leftward or feeding movement of the lever 30 in one instance will be accompanied by an upward movement of the lever to oscillate the blade of the saw in one direction, and after this tooth has been ground the next succeeding leftward or feeding movement of the lever 30 will be accompanied by downward pressure which will oscillate the saw blade to its other position. Then the third movement of the lever will again be accompanied by an upward pull which will oscillate the saw blade back to its first position, this operation being repeated as long as necesary. Between the successive movements of the feeding lever, the handle 65 is pulled forwardly to bring the grinding element 60 into contact with the saw teeth. By operating the handle 65 by the operator's left hand, for example, and the lever 30 by the operator's right hand, extremely rapid progress may be made and the entire saw may be ground or sharpened in an unusually short space of time and in a very satisfactory manner.

The entire apparatus is compact and light, and may be carried about easily from place to place. Because of the various adjustments which have been described, the machine may be used satisfactorily upon saws which differ considerably from each other in shape, size, or pitch of the teeth.

While one embodiment of the invention has been disclosed, it is to be understood that the inventive idea may be carried out in a number of ways. This application is therefore not to be limited to the precise details disclosed, but is intended to cover all variations and modifications thereof falling within the spirit of the invention or the scope of the appended claims.

I claim as my invention:

1. In a saw sharpening machine, the combination with a grinding element, of means for holding a saw blade in position to be ground by said element, said holding means being mounted for oscillation about an axis substantially in the plane of a saw blade held thereby, so that different teeth of such blade may be ground to different shapes by oscillating said holding means.

2. In a saw sharpening machine, the combination with a grinding wheel rotatable about an axis, of means for holding a saw blade in position to be ground by said wheel, said holding means being mounted for movement relative to said wheel so that it may be shifted from a position in which the plane of a saw blade held by said means lies on one side of said axis during a grinding operation to a position in which said plane lies on the opposite side of said axis during another grinding operation, so that different teeth of such blade may be ground to different shapes by shifting said holding means, and means associated with said holding means for concomitantly advancing said saw blade and shifting said holding means.

3. In a saw sharpening machine, the combination with a grinding wheel rotatable about an axis, of means for holding a saw blade in position to be ground by said wheel, said holding means being mounted for movement relative to said wheel so that it may be oscillated about another axis substantially in the plane of said blade and lying between said blade and said axis of the wheel, from a position in which the plane of a saw blade held by said means lies on one side of the wheel axis during a grinding operation to a position in which said plane lies on the opposite side of said wheel axis during another grinding operation, so that different teeth of such blade may be ground to different shapes by shifting said holding means, and adjustable stop means for limiting said movement of said holding means.

4. In a saw sharpening machine, the combination with a grinding wheel rotatable about an axis, of means for holding a saw blade in position to be ground by said wheel, said holding means being mounted for movement relative to said wheel so that it may be shifted from a position in which the plane of a saw blade held by said means lies on one side of said axis during a grinding operation to a position in which said plane lies on the opposite side of said axis during another grinding operation, so that different teeth of such blade may be ground to different shapes by shifting said holding means, and detent means for retaining said holding means in either of said positions to which said holding means is shifted.

5. In a saw sharpening machine, the combination with a grinding wheel rotatable about an axis, of means for holding a saw blade in position to be ground by said wheel, said holding means being mounted for movement relative to said wheel so that it may be shifted from a position in which the plane of a saw blade held by said means lies on one side of said axis during a grinding operation to a position in which said plane lies on the opposite side of said axis during another grinding operation, so that different teeth of such blade may be ground to different shapes by shifting said holding means, stop means for limiting said movement of said holding means in each direction, and resilient detent means tending when said holding means is shifted beyond a central position to move said holding means into its extreme position in contact with said stop means.

6. In a saw sharpening machine, the combination with a grinding element, of means for holding a saw blade in position to be ground thereby, said means being oscillable about an axis and mechanism for feeding such saw blade to present successive teeth thereof to said grinding element, said feeding mechanism comprising a manually controlled operating member, a pawl operated thereby for engaging the teeth of the saw blade, means for adjusting the position of said pawl with respect to said operating member, and adjustable stop means for limiting movement of said operating member, said operating member serving also as a handle for oscillating said holding means about said axis.

7. In a saw sharpening machine, the combination with a grinding element, of means for holding a saw blade in position to be ground by said element, said holding means being mounted for oscillation about an axis substantially parallel to the plane of a blade held thereby, so that one tooth of such blade may be ground to one shape when said holding means is in one position and another tooth may be ground to a different shape by oscillating said holding means to a different position, and mechanism for feeding said saw blade to present successive teeth thereof to said grinding element, said feeding mechanism including a member movable in one direction to feed said blade and movable in another direction to oscillate said holding means.

8. In a saw sharpening device, the combination with a base, of a rotatable grinding wheel mounted on said base, means for holding a saw blade in position to be ground by said wheel, said holding means being oscillable about an axis substantially parallel to said blade, and means for retaining said holding means in the position to which it is oscillated, said means comprising a lug on said base, and a resilient member on said holding means which engages said lug to retain said holding means in adjusted position.

9. In a saw sharpening device, the combination with grinding means, of means for holding a saw blade in position to be ground by said grinding means, said holding means being movable about an axis extending longitudinally thereof, single means for feeding said blade to present successive teeth thereof to said grinding means and for moving said holding means about said axis, and means for retaining said holding means in the position to which it is moved.

10. In a saw sharpening device, the combination with a base, of saw holding means mounted on said base, a grinding wheel, a frame on which said wheel is mounted, and a support for said frame associated with said base, said base having a plurality of spaced slots, said support having an aperture registering with one of said slots, a connecting member passing through said aperture and said one of said slots, said support also having an arcuate opening spaced from said aperture and extending transversely of another of said slots, and a second connecting member extending through said arcuate opening and said other of said slots, said aperture and arcuate opening permitting rotation of said support on said base to vary the angle of said wheel relative to a saw retained in said holding means, said slots permitting movement of said support toward and away from a saw retained in said holding means.

11. In a saw sharpening device, the combination with a base, of saw holding means mounted on said base, a grinding wheel, a frame on which said wheel is rotatably mounted, a support for said frame associated with said base, said frame being oscillable on said support to move said wheel toward and away from a saw blade held by said holding means, said holding means being oscillable about an axis lying substantially in the plane of said blade and between said blade and the center of said wheel, said support being adjustable on said base about an axis substantially perpendicular to the plane of said blade to vary the angle of said wheel relative to said blade, means for securing said support in adjusted position on said base, and single means for advancing said saw blade and for oscillating said holding means.

EMANUEL STAUDER.